United States Patent [19]

Warren et al.

[11] Patent Number: 4,687,995

[45] Date of Patent: * Aug. 18, 1987

[54] SECONDARY FIELD DIELECTRIC CONSTANT AND/OR RESISTIVITY WELL LOGGING SYSTEM AND METHOD

[75] Inventors: Wayne F. Warren; Theodore W. Nussbaum; Percy T. Cox; Donald L. Johnson, all of Houston, Tex.

[73] Assignee: Texaco Inc., White Plains, N.Y.

[ * ] Notice: The portion of the term of this patent subsequent to Nov. 11, 2003 has been disclaimed.

[21] Appl. No.: 586,465

[22] Filed: Mar. 5, 1984

[51] Int. Cl.[4] .......................... G01V 3/30; G01V 3/28; G01V 3/10; G01V 3/18

[52] U.S. Cl. .................................................. 324/341

[58] Field of Search ................................ 324/339–341

[56] References Cited

U.S. PATENT DOCUMENTS 2,919,397  12/1959  Morley ................................ 324/334
4,107,598   8/1978  Meador et al. ..................... 324/341

Primary Examiner—Reinhard J. Eisenzopf
Assistant Examiner—Walter E. Snow
Attorney, Agent, or Firm—Robert A. Kulason; Ronald G. Gillespie

[57] ABSTRACT

Apparatus for determining the dielectric constant and/or resistivity of earth formations traversed by a borehole includes a transmitter which transmits electromagnetic energy into the earth formation from a first location in the borehole at a frequency which enables the electromagnetic energy to propagate throughout the surrounding earth formations. Receivers receive electromagnetic energy at two locations in the borehole which are spaced longitudinally from the transmitter provide signals representative of the total electromagnetic fields at the receiver locations. Circuitry determines the dielectric constant and/or resistivity of the formations in accordance with a secondary field ratio and a phase difference derived from the signals provided by the receivers.

12 Claims, 6 Drawing Figures

SECONDARY FIELD DIELECTRIC CONSTANT AND/OR RESISTIVITY WELL LOGGING SYSTEM AND METHOD

BACKGROUND OF THE INVENTION

Field of the Invention

The present invention relates to well logging systems and methods in general and, more particularly, to dielectric constant well logging systems and methods.

SUMMARY OF THE INVENTION

Apparatus for determining dielectric constant and/or resistivity of earth formations traversed by a borehole includes a transmitter which transmits electromagnetic energy into the earth formation from a first location in the borehole at a frequency which enables the electromagnetic energy to propagate throughout the surrounding earth formations. Receivers, receiving electromagnetic energy at two locations in the borehole which are spaced longitudinally from the transmitter, provide signals representative of the total electromagnetic field at the receiver locations. Circuitry determines the dielectric constant and/or resistivity of the formations in accordance with a secondary field ratio and a phase difference derived from the signals provided by the receiving means.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

DESCRIPTION OF THE INVENTION

High frequency dielectric measurement has been demonstrated as a useful means of determining water saturation in high resistivity formations where fresh water and oil zones are difficult to distinguish. Texaco's U.S. Pat. Nos. 4,012,689, 4,107,598, and 4,107,598 describe logging systems comprising three or more coils and operating in the 10 to 60 megahertz range.

While the existing dielectric logging system works well in high resistivity formations, there also is a need to determine water saturation in lower resistivity reservoirs where unknown water salinities often make conventional resistivity-based $S_W$ calculations unusable. The present invention, which also operates in the 10 to 60 Mgz range, is a dielectric constant measurement technique which provides a more accurate measurement in this low resistivity range.

Figure 1A:
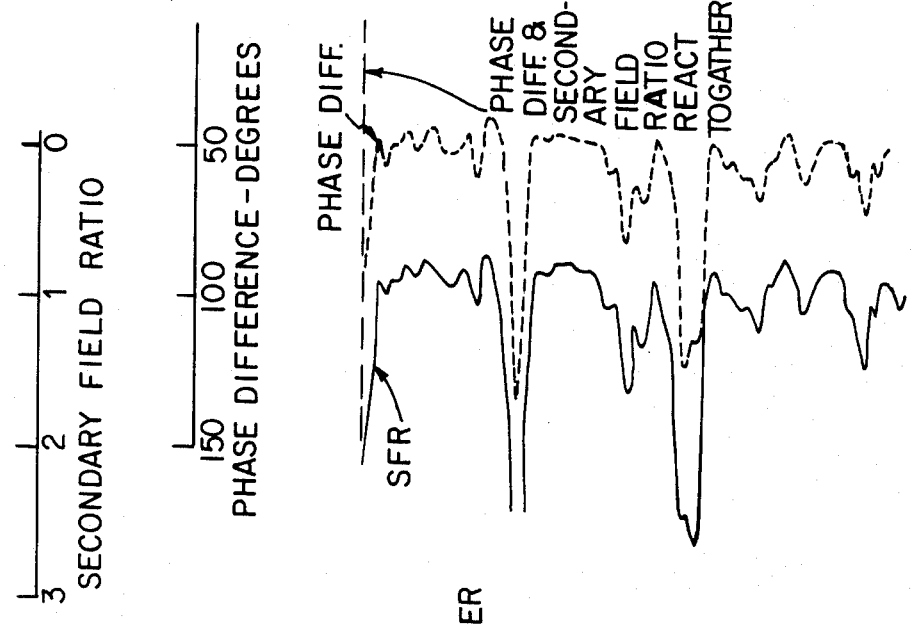
FIGS. 1A, 1B and 1C are graphical representations of plots of the dielectric constant; the amplitude ratio and phase measurements provided by a conventional dielectric well logging system; and the secondary field ratio and phase measurements using the system and method of the present invention, respectively.

Another advantage of the present invention is that overshoot on the traces known as "horns" which occur in lower resistivities when contrast zones are encountered do not occur. The horns normally occur when moving through a high resistivity zone and a low resistivity zone is suddenly encountered. It repeats as the logging tool leaves the low resistivity zone and enters the high resistivity zone again. The horns give an abnormally low reading of the dielectric constants at the boundary. A low dielectric constant reading usually would indicate the possible presence of oil. However, this may not be true because of the horn effect. The present invention eliminates the abnormal "horn" excursion by using the secondary field ratio in determining the dielectric constant as can be seen in FIG. 1A.

Figure 1B:
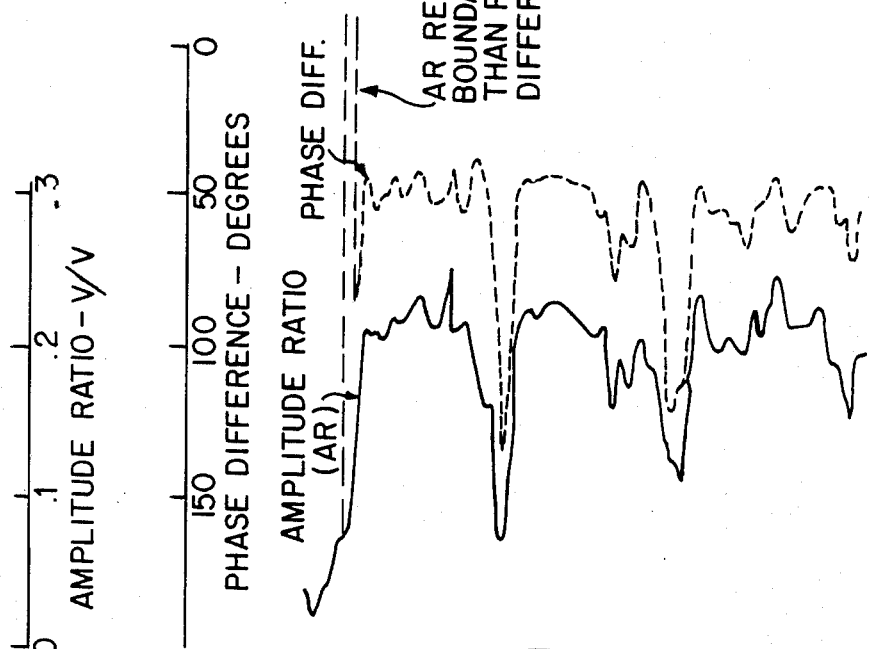
Figure 1C:
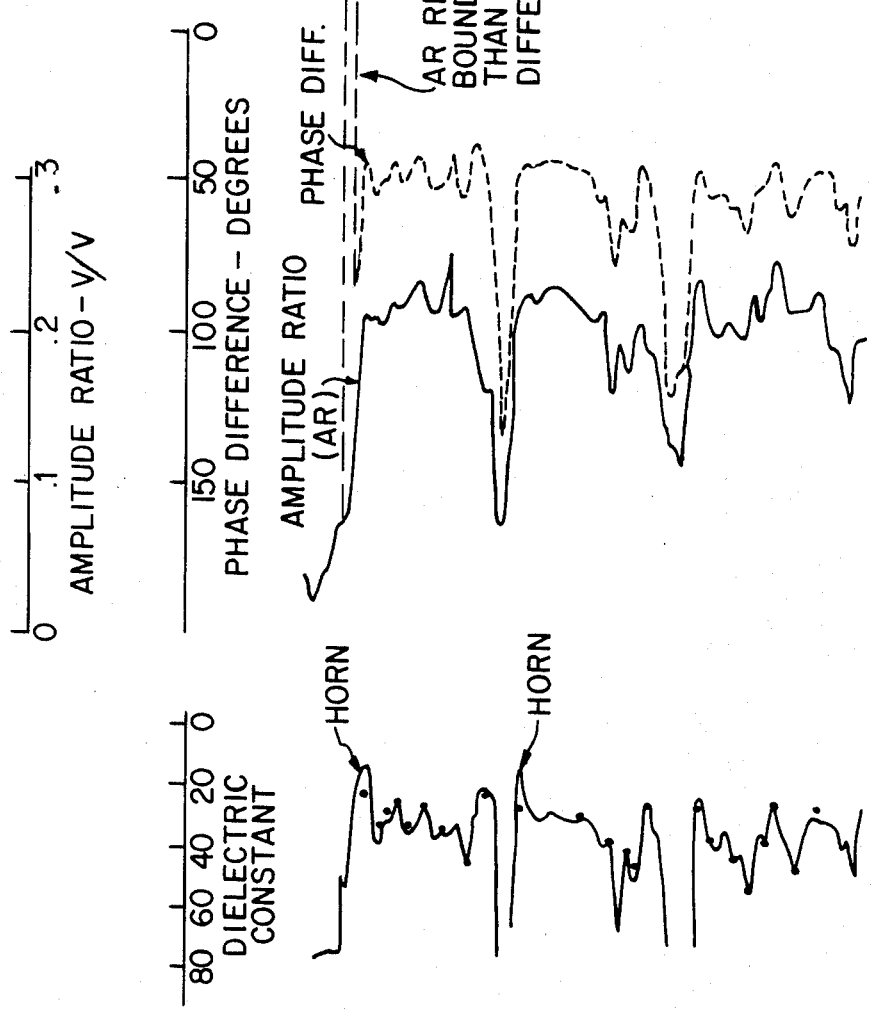

The reason for the horns is that using conventional dielectric constant well log techniques the amplitude ratio measurement investigates a larger volume of an earth formation than the phase measurement. As a result, there is a lag between the recording traces. Using the present invention the SFR and phase are looking at essentially the same volume so that there is little or no lag between the SRF trace and the phase trace. This can be seen in FIGS. 1B and 1C.

The aforementioned patented dielectric logging systems use a total field concept. In other words, the signals at each receiver coil consist of contributions from both a "primary" electromagnetic field and a "secondary" electromagnetic field. The primary field is that part of the receiver signal which results directly from the electromagnetic field generated by the transmitter coil. The changing electromagnetic field of the transmitter coil also excites eddy currents in the surrounding formation. These eddy currents consist of both conductive and displacement currents. The displacement current density is proportional to the dielectric constant of the surrounding material, while the conductive current density is proportional to the conductivity of the surrounding material. Both the conductive and displacement currents are themselves a source of an electromagnetic field, which is called the secondary field. Thus, the primary field is the field which is detected when the sonde is placed in air with no surrounding material. When the sonde is lowered into a borehole, both the primary field and the secondary field are present at the long-spaced ($H_{z1}$) and short-spaced ($H_{z2}$) receiver coils in proportions which are dependent on the dielectric constant and resistivity (conductivity) of the surrounding formation.

It has been discovered that certain advantages can be realized by cancelling the primary field at the receivers and thus making a secondary field measurement. This can be done by adjusting the amplitude of the distant receiver signal until it is equal to the near receiver signal with the sonde in air.

Thus, in air $H_{z1} - H_{z2} = 0$ and the primary field has been cancelled.

Figure 2:
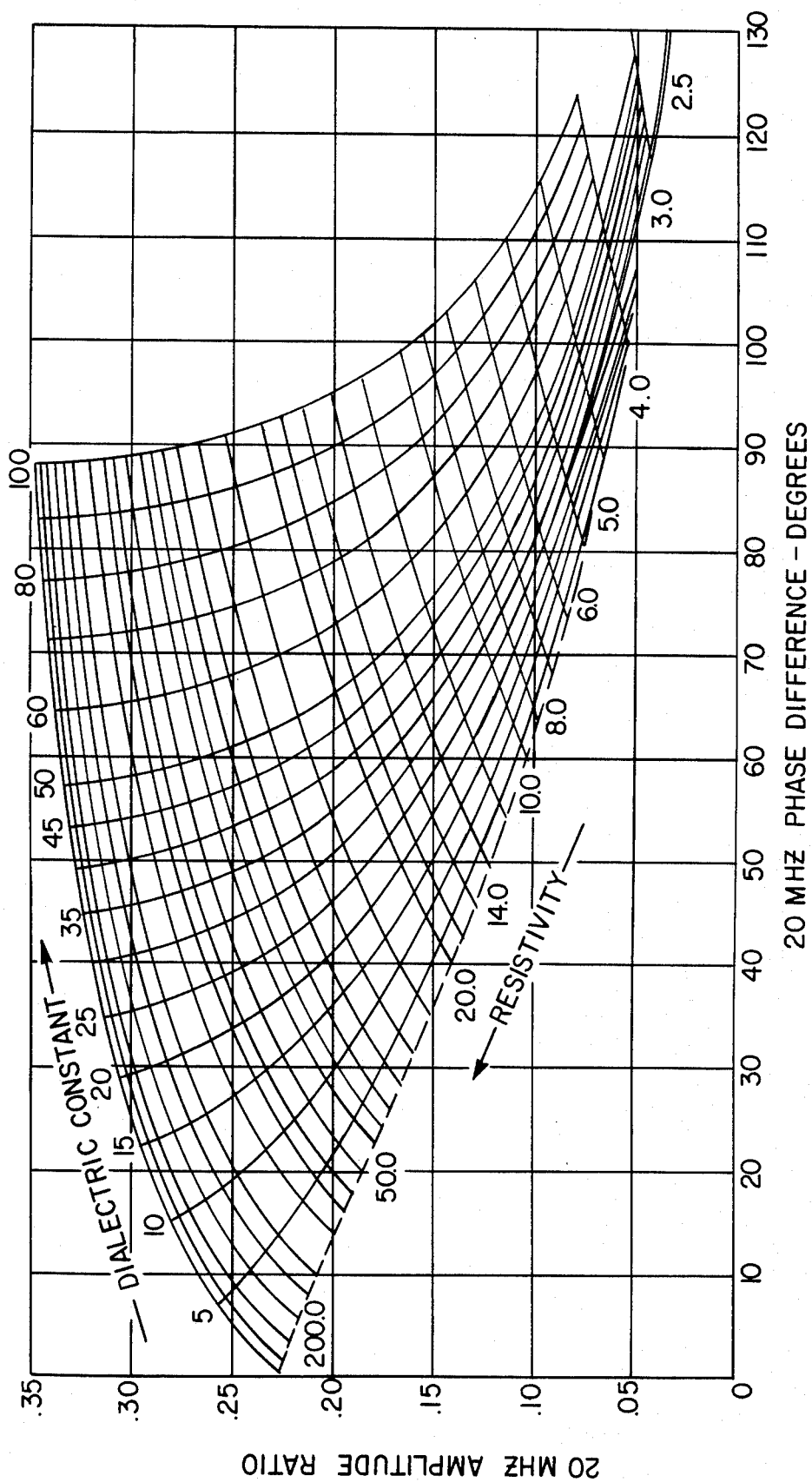
FIG. 2 is a cross plot of amplitude ratio versus phase difference.

One important advantage is the improvement in dielectric constant measurement resolution at low values of formation resistivity. The theoretical crossplot for a conventional dielectric logging sonde is shown in FIG. 2. It should be noted that the dielectric constant lines come closer together as the formation resistivity decreases. Achieving an accurate measurement of dielectric constant becomes increasingly difficult as resistivity decreases.

Figure 3:
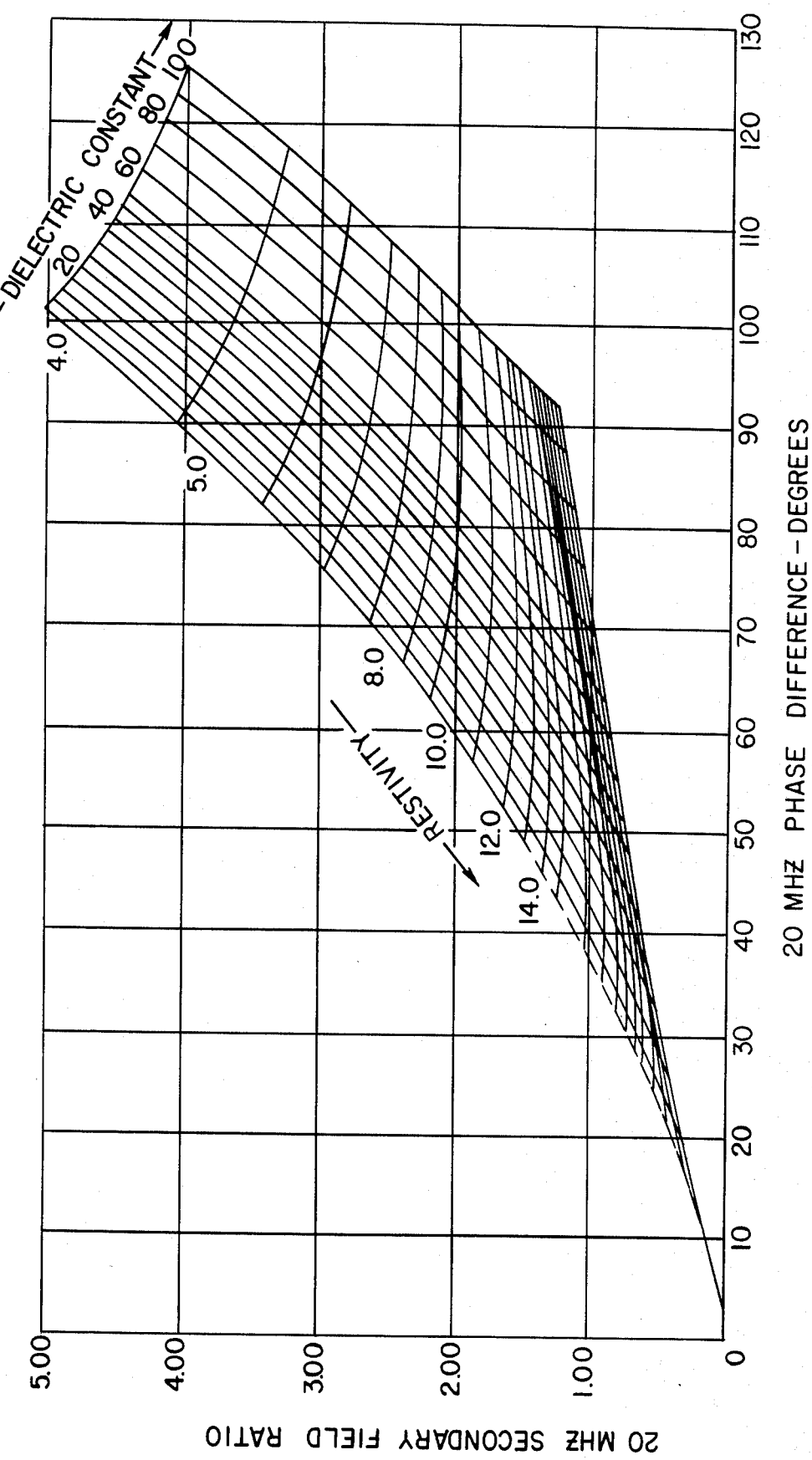
FIG. 3 is a cross plot of secondary field ratio and phase difference for the same frequency as FIG. 2 plot using the system of the present invention.

The theoretical crossplot for one embodiment of the proposed dielectric logging sonde is shown in FIG. 3. The physical coil arrangement for this method would be identical to the present system. Only the measurement means, which is accomplished at the surface, would change. Instead of measuring the amplitude ratio AR of the total field $$AR = |\vec{H}_{z1}|/|\vec{H}_{z2}| \qquad 1.$$

a secondary field ratio $$SFR = |(\vec{H}_{z1} - \vec{H}_{z2})/\vec{H}_{z1}| \qquad 2.$$

is measured. The secondary field ratio is plotted versus the phase difference to arrive at formation dielectric constant and resistivity values. In FIG. 3, it should be noted that the dielectric constant lines do not converge as resistivity decreases. The resulting increases in dielectric resolution at low resistivities is evident.

Measurement of the Secondary Field Ratio (SFR) can be accomplished with the aforementioned patented dielectric constant logging systems with only minor modification. Two methods of measuring the SFR can be employed. The first is an analog method whereby the receiver signals at the surface would be phase shifted, amplified, rectified and applied to an analog divider module. The second method is digital and would use the existing surface unit microprocessor with an additional arithmetic processor to calculate the SFR using equation 2 where SFR is the magnitude of the secondary field ratio and $H_{z1}$ and $H_{z2}$ are the field strength values at the long-spaced and short-spaced receiver coils, respectively. To achieve a measurement of the secondary field only, $H_{z1} - H_{z2}$ equals zero in air.

These methods allow one to make the receiver measurements, as in the conventional dielectric constant logging system, and then to calculate the SFR at the surface. The conventional system measures $\vec{H}_{z1}$ and $\vec{H}_{z2}$ relative to their values in air. Thus, equation (2) becomes:

$$SFR = |[(\vec{H}_{z1}/\vec{A}_{z1}) - (\vec{H}_{z2}/\vec{A}_{z2})]/(\vec{H}_{z1}/\vec{A}_{z1})| \qquad 3.$$

where $A_{z1}$ and $A_{z2}$ are the values of the electromagnetic field strength in air at the far and near receivers, respectively. This can be reduced to the form:

$$SFR = 1 - [(\vec{A}_{z1}/\vec{A}_{z2}) \cdot (\vec{H}_{z2}/\vec{H}_{z1})] \qquad 4.$$

Solving for the magnitude of (4) yields:

$$SFR = \sqrt{1 - 2F \cos(-P + 1°) + F^2} \qquad 5.$$

where $F = (A_{z1}/A_{z2}) \cdot (H_{z2}/H_{z1})$, and $P = \theta_{z1} - \theta_{z2}$. The 1° phase angle results from the phase shift in air between the long and short receivers in the conventional dielectric constant logging sonde.

Figure 4:
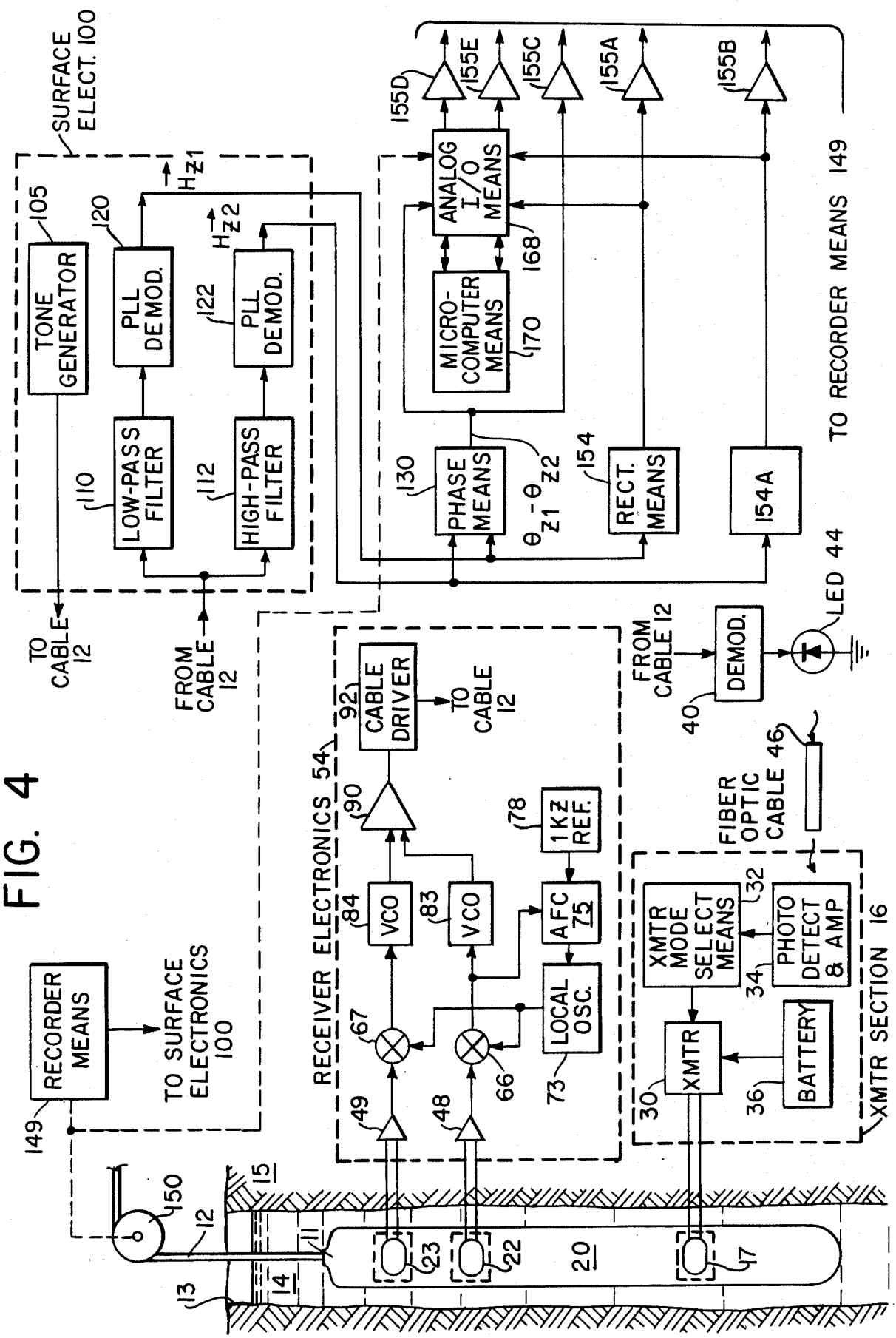
FIG. 4 is a simplified block diagram of a well logging system constructed in accordance with the present invention.

Referring now to FIG. 4, a well logging sonde 11 whose main body member is preferably constructed of fiberglass or some other non-conductive material of sufficient strength characteristics, is shown suspended by a well logging cable 12 in an uncased well borehole 13 filled with borehole fluid 14 and surrounded by low resistivity earth formations 15 whose dielectric constant and resistivity properties are to be measured. Within the lower portion of the well logging sonde 11 is housed a transmitter electronic section 16 and associated transmitting coil 17. Transmitting coil 17 is a wire wound on a non-conducting machinable ceramic material. Transmitting coil 17 is energized at a frequency within a preferred range of 10 MHz to 60 MHz, preferably at a frequency of 20 MHz as hereinafter described. Coil 17, when so energized, transmits electromagnetic energy into earth formations 15. Receiver coils 22 and 23 which are helically wound on machinable ceramic forms comprise tuned resonant circuits which are sensitive to the transmitting frequency, i.e. the preferred frequency of 20 MHz. Receiver coils 22 and 23 are located 24 and 40 inches, respectively, from transmitter coil 17 in sonde 11. Transmitter coil 17 and receiver coils 22 and 23 are electrostatically shielded as indicated by the dotted line boxes around the coils. The coil types and spacings just recited are intended as being illustrative only and it will be appreciated by those skilled in the art that other operating frequencies in the range of interest for practicing the invention and other coil types and spacings than these may be used without departing from the inventive concept.

Transmitter section 16 includes a transmitter 30 which may be in an off state, a low power operational state, or a high power operational state as determined by an operator. Transmitter 30 is used to energize transmitter coil 17. Transmitter section 16 includes also transmitter mode select means 32 which provides a control signal to transmitter 30, to control the state of transmitter 30, in response from a signal from a photo detector and amplifier 34. Transmitter 30 is energized by DC voltage from battery 36. An operator at the surface determines the transmitter mode and provides, as hereinafter explained, a modulated signal down well logging cable 12 to a demodulator 40 located in the upper section of sonde 11 which demodulates the signal and provides it to a ligh emitting diode 44. Light emitting diode 44 provides a corresponding light output through a fiber optic cable 46 which passes through coils 23, 22 and 17 and is then converted back into an electrical signal by photo detector and amplifier 34 located in transmitter section 16. The purpose of using fiber optic cabling is to allow the state of transmitter 30 to be controlled without creating electromagnetic interference in receiver coils 22 and 23.

The signals from coils 22 and 23 are provided to amplifiers 48 and 49, respectively, of receiver electronics 54. The outputs of receiver amplifiers 48 and 49 are provided to RF mixers 66 and 67, respectively, where the 20 MHz signals are heterodyned to a lower frequency, preferably 1 kilohertz, by action of a local oscillator 73. An automatic frequency control circuit 75 maintains the intermediate frequency locked to the frequency of 1 kilohertz reference signal provided by a 1 kilohertz reference source 78. The outputs of mixers 66 and 67 are provided to voltage controlled oscillators 83 and 84, respectively, which converts the mixers' signals to frequency modulated signals.

Voltage controlled oscillators 83 and 84 provide frequency modulated signals having carrier frequencies of 20 and 45 kilohertz, respectively. These carrier frequencies were chosen to provide adequate separation of the modulated carriers to allow for low pass and high pass filtering at the surface and further to fall within the maximum transmission capability of the logging cable. The frequency modulated signals provided by voltage controlled oscillators 83 and 84 are provided to summing amplifier means 90 where they are summed and provided to a cable driver 92. Cable driver 92 provides the sum signal from summing means 90 to cable 12 which conducts it uphole to the surface electronics 100 on the surface.

As noted earlier, transmitter 30 may be in any one of three states. The transmitter operational state is selected at the surface to allow high power operation of transmitter 16 only while actual logging and calibrations are in process. This permits the standard battery pack to operate within its power capabilities while providing a factor of 10 increase in transmitter input power during logging. Transmitter 30 state is selected by sending a dual tone signal from tone generator 105 of surface electronics 100 to cable 12 where it is conducted downhole to demodulator 40 in sonde 11. As explained previously in the discussion of transmitter section 16, the signals are then conveyed to photo detector 34 via fiber optic cable and thence to transmitter mode select 32 which controls the mode of transmitter 30.

Surface electronics 100 also includes a low pass filter 110 and a high pass filter 112 which filters the signal from cable 12 to provide reproductions of the signals from voltage control oscillators 84 and 83, respectively, to pass locked loop demodulators 120 and 122, respectively. The output of phase locked loop demodulators 120 and 122 are reproductions of the signals provided by receiver coils 23 and 22, respectively, each signal having a frequency of 1 kilohertz.

The signals from phase locked loop demodulators 120 and 122 are provided to phase means 130 which provide a signal representative of the phase differences between the signals received by coils 22 and 23.

Phase locked loop demodulators 120 and 122 provide their output signals also to rectifier means 154 and 154A, respectively. The output of phase means 130 and rectifier means 154 and 154A are provided to an analog input/output means 168. Analog input/output means 168 provides them as digital signals to microprocessor means 170. Analog input/output means 168 receives pulses from sheave wheel 150 and provides corresponding digital signals to microprocessor means 170 where depth shifting of data may be done if so desired. Microprocessor means 170 provides digital signals to analog input/output means 168, representative of the dielectric constant and of the resistivity of the earth formations, which in turn provides analog signals. The signals from rectifier means 154 and 154A, from phase means 130, and from analog input/output means 168 are provided to amplifiers 155A, 155B, 155C, 155D, and 155E, which amplify the signals and provides them to recorder means 149.

Microprocessor means 170 performs the calculation of SFR and then uses this value together with the $\theta_{z1}-\theta_{z2}$ phase difference to calculate the dielectric constant value in accordance with aforementioned equations.

Microcomputer means 170 combines the SFR data calculated from the electromagnetic fields at coils 22 and 23 with the phase difference data measured between coils 22 and 23. This is done by programming microcomputer means 170 to interpret the crossplot shown in FIG. 3. This crossplot relates the measured values of SFR and phase difference to the formation electrical parameters of resistivity and dielectric constant. The crossplot represents the solution of the Helmholtz wave equation in a cylindrical geometry for the coils' spacings, frequency and borehole parameters chosen. The phase measurement is depth-shifted by microcomputer means 170 to align the two measure points vertically.

The present invention hereinbefore described uses secondary field ratio measurements as well as a phase shift measurement to determine the resistivity and dielectric constant of low resistivity formations.

What is claimed is:

1. Apparatus for determining the dielectric constant and/or resistivity of earth formations traversed by a borehole comprising:
   means for transmitting electromagnetic energy into the earth formation from a first location in the borehole at a frequency within a frequency range of 10 MHz to 60 MHz,
   receiving means for receiving electromagnetic energy at two locations in the borehole spaced longitudinally from the transmitting means and providing the signals representative of the total electromagnetic field at those locations, and
   determining means connected to the receiving means for determining the dielectric constant and/or resistivity of said formations in accordance with portions of the signals from the receiving means corresponding to secondary electromagnetic fields at the two receiving locations; said determining means includes:
   secondary field ratio means for deriving a secondary field ratio from portions of the signals representative of the secondary electromagnetic fields at the two receiving locations, and
   phase difference means for deriving a phase difference between the signals provided by the receiving means.

2. Apparatus as described in claim 1 in which the determining means includes:
   output means connected to the secondary field ratio means and to the phase difference means for providing output signals representative of the resistivity and the dielectric constant of the earth formations in accordance with the derived secondary field ratio and the phase difference.

3. Apparatus as described in claim 2 in which the frequency of transmission is 20 megahertz.

4. Apparatus as described in claim 3 in which the phase difference means derives the phase difference between the signals provided by the receiving means as being functionally related to the total electromagnetic fields at the two receiving locations.

5. Apparatus as described in claim 3 in which the phase difference means derives the phase difference between the signals provided by the receiving means as being functionally related to the secondary electromagnetic fields at the two receiving locations.

6. A well logging method for determining the dielectric constant and/or resistivity of low resistivity earth formations, in the vicinity of a well borehole comprising the steps of;
   transmitting electromagnetic energy into the low resistivity earth formation from a first location in a borehole at a frequency within a frequency range of 10 MHz to 60 MHz,
   receiving electromagnetic energy at second and third locations in said borehole, where said second location is a predetermined distance from said first location and said third location is at a greater predetermined distance from said first location than said second location,
   providing receiver signals representative of the total electromagnetic fields at the receiving locations in accordance with the received energy, and determining the dielectric constants and/or resistivity of said earth formations in accordance with the signals provided by the receiving step; said determining step includes:
deriving a secondary field ratio from portions of the signals representative of the secondary electromagnetic fields at the second and third locations, and
deriving a phase difference between the signals.

7. A method as described in claim 6 in which the determining step includes:
providing signals representative of the resistivity and dielectric constant of the earth formations in accordance with the secondary field ratio and the phase difference.

8. A method as described in claim 7 in which deriving the phase difference step is done in a manner as to be functionally related to the total electromagnetic fields at the second and third locations.

9. A method as described in claim 7 in which deriving the phase difference step is done in a manner as to be functionally related to the secondary electromagnetic fields at the second and third locations.

10. A well logging system for determining the dielectric constant and/or resistivity of low resistivity earth formations traversed by a borehole comprises:
a well logging sonde adapted to be passed through the borehole including:
means for transmitting electromagnetic energy into the low resistivity earth formation at a frequency within a frequency range of 10 MHz to 60 MHz,
first receiver means located a first predetermined distance from said transmitting means for receiving electromagnetic energy from the low resistivity earth formation and providing a first receiver signal representative of the total electromagnetic field at that location,
second receiver means located a second predetermined distance from said transmitting means for receiving electromagnetic energy from the low resistivity earth formation and providing a second receiver signal representative of the total electromagnetic field at that location, where said second predetermined distance is greater than said first predetermined distance,
means connected to the two receiver means for processing the two receiver signals for application to well logging cable means,
well logging cable means connected to said signal processing means for conducting a signal representative of the receiver signals from said signal processing means out of the borehole; and
surface electronics including
means for providing an indication of the dielectric constant and/or the resistivity of the earth formation in accordance with said signal conducted by said cable means receiving means locations;
said indication means includes:
means connected to the cable means for deriving the two receiver signals from the signal conducted by the cable means,
means for deriving a secondary field ratio from the derived receiver signals, and
means for deriving the phase difference between the derived receiver signals.

11. A well logging system as described in claim 10 in which the derived phase difference is functionally related to the total electromagnetic fields at the locations of the first and second receiving means.

12. A well logging system as described in claim 10 in which the derived phase difference is functionally related to the secondary electromagnetic fields at the locations of the first and second receiving means.

* * * * *